United States Patent [19]
Rader

[11] Patent Number: 6,013,689
[45] Date of Patent: Jan. 11, 2000

[54] METHOD FOR MAKING A CLOSED-CELL PHENOLIC RESIN FOAM, FOAMABLE COMPOSITION, AND CLOSED-CELL PHENOLIC RESIN FOAM

[75] Inventor: Samuel L. Rader, Lewisburg, W. Va.

[73] Assignee: Jiffy Foam, Inc., Ronceverte, W. Va.

[21] Appl. No.: 09/070,765

[22] Filed: May 1, 1998

Related U.S. Application Data

[60] Provisional application No. 60/045,501, May 2, 1997.

[51] Int. Cl.$^7$ .................................................. C08J 9/00
[52] U.S. Cl. ............................ 521/85; 521/88; 521/90; 521/95; 521/96; 521/98; 521/107; 521/128; 521/131; 521/181; 521/910
[58] Field of Search ............................ 521/85, 88, 90, 521/98, 95, 96, 107, 128, 131, 181, 910

[56] References Cited

U.S. PATENT DOCUMENTS

| | | |
|---|---|---|
| 3,389,094 | 6/1968 | D'Alessandro . |
| 4,133,931 | 1/1979 | Beale et al. . |
| 4,140,842 | 2/1979 | Beale et al. . |
| 4,204,020 | 5/1980 | Beale et al. . |
| 4,205,135 | 5/1980 | Beale et al. . |
| 4,207,400 | 6/1980 | Dahms . |
| 4,207,401 | 6/1980 | Dahms . |
| 4,216,295 | 8/1980 | Dahms . |
| 4,247,413 | 1/1981 | Beale et al. . |
| 4,256,803 | 3/1981 | Savey et al. . |
| 4,281,069 | 7/1981 | Harris . |
| 4,303,758 | 12/1981 | Gusmer . |
| 4,353,994 | 10/1982 | Smith . |
| 4,390,641 | 6/1983 | Smith . |
| 4,419,460 | 12/1983 | Ho . |
| 4,423,163 | 12/1983 | Doerge . |
| 4,444,912 | 4/1984 | Carlson et al. . |
| 4,530,939 | 7/1985 | Rickle . |
| 4,539,338 | 9/1985 | Carlson et al. . |
| 4,546,119 | 10/1985 | Lunt et al. . |
| 4,560,707 | 12/1985 | Iwase . |
| 4,575,521 | 3/1986 | Côté et al. . |
| 4,576,972 | 3/1986 | Lunt et al. . |
| 4,595,710 | 6/1986 | Albertelli . |
| 4,694,028 | 9/1987 | Saeki et al. . |
| 4,720,510 | 1/1988 | Marks et al. . |
| 4,882,364 | 11/1989 | Kyle et al. . |
| 4,883,824 | 11/1989 | Meunier et al. . |
| 4,900,759 | 2/1990 | Clark et al. . |
| 4,920,154 | 4/1990 | Monstrey et al. . |
| 4,945,077 | 7/1990 | Meunier et al. . |
| 4,956,394 | 9/1990 | Kifer et al. . |
| 5,234,969 | 8/1993 | Clark et al. . |
| 5,407,963 | 4/1995 | Willson et al. . |
| 5,441,992 | 8/1995 | Santos et al. . |
| 5,444,098 | 8/1995 | Wallaeys et al. . |
| 5,596,022 | 1/1997 | Jones . |

FOREIGN PATENT DOCUMENTS

| | | |
|---|---|---|
| 88 471 | 4/1987 | France . |
| 62261627 | 4/1989 | Japan . |
| WO97/08230 | 3/1997 | WIPO . |

*Primary Examiner*—Morton Foelak
*Attorney, Agent, or Firm*—Jeffrey S. Melcher; Farkas & Manelli, PLLC

[57] ABSTRACT

Provided is a foamable, phenolic resin composition adapted to form a closed-cell phenolic resin foam under substantially atmospheric pressure. The foamable, phenolic resin composition is formulated from a resol resin, a blowing agent, and a bond strength enhancing agent and/or a phenolic resin nucleating agent. The present invention also relates to a method of forming a closed-cell, phenolic resin foam and a closed-cell phenolic resin foam.

38 Claims, No Drawings

METHOD FOR MAKING A CLOSED-CELL PHENOLIC RESIN FOAM, FOAMABLE COMPOSITION, AND CLOSED-CELL PHENOLIC RESIN FOAM

This application claims priority to U.S. provisional patent application Ser. No. 60/045,501, filed on May 2, 1997.

FIELD OF THE INVENTION

The present invention relates to methods for making closed-cell phenolic resin foams. The present invention also relates to foamable composition for making a closed-cell phenolic resin foam, and closed-cell phenolic resin foams.

BACKGROUND OF THE INVENTION

Phenolic resins can be produced from partially reacted resols. Resols are low polymers or oligomers that may be produced by the reaction of phenols with aldehydes, using an excess of aldehyde. The starting materials for use in the manufacture of resols which are used in greatest volume are phenol and formaldehyde. However, other commonly used starting materials include alkyl-substituted phenols such as cresols, xylenols, p-tert-butyl-phenol, p-phenyl-phenol, nonylphenol, and the like. Also diphenols, for example, resorcinol and bisphenol-A. In addition to formaldehyde, other aldehydes can be used, such as acetaldehyde or furfuraldehyde can also be used.

Typically, phenol and formaldehyde are reacted in the presence of a basic catalyst, such as sodium hydroxide or potassium hydroxide, followed by neutralizing the solution and distilling off water. The initially produced resol is commonly referred to as an A-stage resin. This A-stage resin can be reacted further in the presence of an acid catalyst to form a phenolic resin, which is often referred to as curing. During curing, some formaldehyde and water are usually liberated. In particular, the resols (A-stage resins) contain reactive methylol groups that can react further to enlarge the polymeric chain length and/or cross-link to form a three-dimensional network. If the curing is carried out in the presence of a blowing agent, a phenolic resin foam can be produced.

Phenolic resin foams are well known and provide many advantages over polyurethane foams. For example, polyurethane foams produce many toxic fumes when burned, whereas phenolic foams produce significantly less toxic fumes when burned. However, polyurethane foams can be formed having a closed-cell structure. A closed-cell structure is understood as the ability of the cell wall to inhibit the outward diffusion of trapped blowing gas and the inward diffusion of air. Such closed-cell polyurethane foams can be produced under atmospheric pressure.

In contrast, conventional phenolic resin foams must be produced under high pressure to form such a closed-cell structure. U.S. Pat. No. 4,423,163 describes such a high pressure method for making a closed-cell phenolic resin foam, in which the foam is produced under about 6 psi. The requirement of pressure for making a closed-cell phenolic foam results in significant disadvantages and is not commercially feasible, especially when compared to closed-cell polyurethane foams that can be produced under atmospheric pressure.

Thus, there is a great need for a method for making a closed-cell phenolic resin foam that does not require the use of pressure greater than about atmospheric. There is also a need for a foamable composition that is adapted to provide a closed-cell phenolic resin foam, even when blown and cured under atmospheric pressure.

SUMMARY OF THE INVENTION

An objective of the present invention is to provide foamable, phenolic resin compositions that are capable of providing closed-cell phenolic resin foams, even when blown and cured under substantially atmospheric pressure.

Another objective of the present invention is to provide foamable, phenolic resin compositions that are capable of providing various closed-cell phenolic resin foams exhibiting from rigid to flexible properties.

The above objectives and other objectives are obtained by the novel foamable, phenolic resin compositions according to the present invention. Provided is a novel foamable, phenolic resin composition adapted to form a closed-cell phenolic resin foam under substantially atmospheric pressure. The foamable, phenolic resin composition is formulated from a composition comprising:

a resol resin;

a blowing agent; and a bond strength enhancing agent which enhances the strength of a bond formed between phenol groups of the resol resin during formation of the closed-cell phenolic resin foam. The bond strength enhancing agent is selected and present in an amount sufficient to provide a strength of bond which is greater than a pressure provided by the blowing agent during blowing and curing of the closed-cell phenolic resin foam.

Also provided is a novel foamable, phenolic resin composition adapted to form a closed-cell phenolic resin foam under substantially atmospheric pressure. The foamable, phenolic resin composition is formulated from a composition comprising:

a resol resin;

a phenolic resin nucleating agent having an average particle size of less than about 0.1 mm; and a blowing agent. The phenolic resin nucleating agent and the blowing agent are selected and present in an amount to provide a closed-cell phenolic resin foam.

The invention also provides methods of forming closed-cell foams from the foamable, phenolic resin compositions.

The invention further provides closed-cell phenolic resin foams formed from the foamable, phenolic resin compositions.

DETAILED DESCRIPTION OF THE INVENTION

The present invention provides novel foamable, phenolic resin compositions that are adapted to provide closed-cell phenolic resin foams, even when blown and cured under-substantially atmospheric pressure. The versatile foamable, phenolic resin compositions can be used to form closed-cell phenolic resin foams in open molds, on surfaces, or on substantially unpressurized foam production lines. Closed-cell, as used hereinafter refers to a phenolic resin foam having at least about 50% of the cells being closed such that blowing gas trapped within the closed-cell cannot diffuse outward and air cannot diffuse into the closed-cell.

Surprisingly, the closed-cell foams can be formed using one or more of the following components:

(1) a bond strength enhancing agent to provide a bond strength greater than the pressure of the blowing agent during blowing of the foam; or (2) a phenolic resin nucleating agent to provide uniform, small cell sizes.

To further enhance the capability of forming close-cell foams, the components (1) and/or (2) can be combined with a novel blended blowing agent comprising at least two compounds having different boiling points to provide a smoother expansion of cells during blowing.

(1) Bond Strength Enhancing Agent

It has now been found that by balancing the pressure of the blowing agent with the bond strength between the phenol rings in the phenolic resin, a closed-cell phenolic resin foam can be formed under substantially atmospheric pressure. Furthermore, a closed-cell phenolic resin foam can be produced under substantially atmospheric pressure having upwards of 80% of the cells being closed, and even about 90% or more of the cells being closed, as measured using ASTM D 2856-94.

By increasing the strength of the bonds between the phenol rings, the ability of the cell walls to resist bursting during blowing and/or curing of the phenolic resin can be enhanced. Thus, by balancing (1) the gas pressure against the cell walls during blowing with (2) the strength of the bonds between the phenol rings, such that the blowing pressure is less than the bond strength during blowing, closed-cells can be maintained throughout the blowing and curing steps to form a closed-cell phenolic resin foam. In general, the gas pressure supplied by the blowing agent should be sufficiently high enough to provide the desired size of cells, yet low enough to avoid bursting the cell walls, such that at least about 50% of the cells are closed.

The bond strength between the phenol rings in the phenolic resin can be increased by adding a bond strength enhancing agent according to the present invention. The bond strength enhancing agent can be a carbon containing compound having hydroxyl groups that are capable of reacting with the methylol groups present on the phenolic resin to provide a link between phenol rings in the phenolic resin. For example, when a resol resin formed from phenol and formaldehyde is used to form the phenolic resin foam, a suitable bond strength enhancing agent would be one that has the ability to strengthen the methylene bridges between the phenol rings of the phenolic resin. Thus, assuming methylene bridge bond energy between phenol rings formed from phenol and formaldehyde is about 130 Kjoules/mole, the average bond strength between the phenol rings when utilizing a bond strength enhancing agent should be greater than 130 Kjoules/mole, preferably greater than about 150 Kjoules/mole, and most preferably at least about 180 Kjoules/mole. The bond energy is understood herein to be the amount of energy necessary to break one mole of the selected bonds. In general, the greater the average bond strength between the phenol rings, the greater the blowing pressure that can be used during blowing and yet substantially avoid bursting the cell walls.

Examples of suitable bond strength enhancing agents include polyvinyl alcohol polyvinyl acetate, resorcinol, urea, melamine, polyvinyl alcohol, and 1,3-dichloro-2-propanol phosphate. Preferably, the bond strength enhancing agent comprises 1,3-dichloro-2-propanol phosphate.

The bond strength enhancing agent can be used in an amount that provides the desired level of bond strength between the phenol rings in the phenolic resin. Based on the disclosure provided herein, one of ordinary skill in the art will be able to select a suitable bond strength enhancing agent and determine a suitable amount of the bond strength enhancing agent without undue experimentation. Examples of suitable amounts of bond strength enhancing agent include from about 1 to about 30 wt. %, preferably from about 1 to about 20 wt. %, and most preferably about 1 to about 10 wt. % based on the total weight of the foamable composition.

When forming a closed-cell phenolic resin foam according to the present invention using mainly (1) a bond strength enhancing agent, the average cell size produced is usually about 0.5 mm and greater, preferably from about 0.5 mm to about 1.5 mm, and more preferably from about 0.5 mm to about 1 mm. Furthermore, the friability is usually about 50% or greater. Thus, when a more rigid, closed-cell foam is desired, a bond strength enhancing agent can be utilized to form the close-cell phenolic resin foam. To produce a less friable, more flexible close-cell foam, the phenolic resin nucleating agent can be utilized in combination with, or even without, a bond strength enhancing agent, as described below.

The blowing agent should be selected to provide a pressure high enough to provide the desired cell size, but low enough pressure to avoid bursting the cell walls, such that at least about 50% of the cells are closed, at the desired blowing temperature. Suitable blowing temperatures are from about the boiling temperature of the blowing agent and greater, which for example can be from about 30 to about 70° C., preferably about 35 to about 55° C. In general, the higher the temperature the greater the pressure on the cell walls. Preferably, the blowing temperature is significantly less than 100° C. because when water is present in the foamable composition the vapor pressure of the water will have a greater effect on cell wall pressure as the temperature becomes closer to 100° C.

The blowing agent can be formulated from any inorganic or organic substance that provides the desired vapor pressure at the selected blowing temperature. For example, the blowing agent can be produced in situ during the blowing and curing process of forming the foam, or the blowing agent can be formulated from one or more volatile liquids or solids that provide the desired vapor pressure.

Examples of suitable blowing agents include hydrocarbons, chlorofluorocarbons, carbonate containing compounds, or nitrogen containing compounds, or mixtures thereof, which have a boiling point of from about 30 to about 70° C.

Preferably, the blowing agent is a volatile organic solvent having a boiling point and/or vapor point that provides a vapor pressure sufficiently high enough to provide the desired cell size, yet low enough to substantially avoid bursting the cell walls such that at least about 50% of the cells are closed, at the selected blowing temperature. Based on the disclosure provided herein, one of ordinary skill in the art will be able to select a suitable blowing agent to provide the level of gas pressure during blowing and/or curing to provide the desired cell size, such that at least about 50% of the cells are closed. Thus, a phenolic resin foam can be produced having at least about 50% of the cells being closed.

Examples of preferred blowing agents include volatile organic liquids, such as, ethers and hydrocarbons, having from about 3 to about 10 carbon atoms, such as pentane, hexane and petroleum ether.

The blowing agent can be used in an amount that provides a sufficient volume of gas to provide the desired cell size at the selected blowing temperature. Based on the disclosure provided herein, one of ordinary skill in the art will be able to select a suitable blowing agent and determine a suitable amount of the blowing agent without undue experimentation. Examples of suitable amounts of liquid volatile blowing agent have been found to be from about 1 to about 30 wt.

%, preferably from about 1 to about 20 wt %, and most preferably from about 1 to about 15 wt %, based on the total weight of the foamable composition.

The foamable composition should also contain a catalyst that provides the desired cell size. In general, the better the catalyst is homogenized in the foamable composition before curing initiates, the more uniform and smaller average diameter of the cells formed during blowing and curing. Thus, a catalyst should be selected that provides the desired cell size during blowing and curing. Based on the disclosure provided herein, one of ordinary skill in the art will be able to select a catalyst which provides the desired cell size in the cured foam. Examples of suitable catalysts include organic and inorganic acids. Specific examples of suitable acid catalysts, such as, toluene sulfonic acid (TSA), xylene sulfonic acid (XSA), phenol sulfonic acid (PSA), sulfonic acid, phosphoric acid, hydrochloric acid, fluoboric acid, formic acid, acetic acid, oxalic acid and mixtures thereof. Preferred catalysts are TSA and XSA. An example of a preferred commercial catalyst is Ultra Tx (Whitco Corp.), which is about 80% TSA and about 20% XSA.

The catalyst can be present in an amount suitable to provide the desired cure speed and cell size. Based on the disclosure provided herein, one of ordinary skill in the art will be able to select a suitable catalyst and determine a suitable amount of the catalyst without undue experimentation. Examples of suitable amounts of catalyst have been found to be from about 1 to about 30 wt. %, more preferably from about 1 to about 20 wt %, and most preferably from about 1 to about 10 wt. %, based on the total weight of the foamable composition.

To improve the ability of the catalyst to homogenize in the foamable composition and thereby form smaller average cell sizes, the catalyst can be combined with a catalyst emulsifier. In general, the better the catalyst is dispersed throughout the foamable composition, the more even the curing reaction will occur and the more even the temperature will be throughout the forming foam. A more even temperature throughout the forming foam will generally provide more consistent cell wall pressures among the different cells being formed throughout the foam, which can result in a narrower distribution of cell diameters in the foam. As discussed above, a narrow distribution of cell sizes is desired because the narrower the distribution of cell sizes the more uniform the phenolic resin foam and the greater the closed-cell content. As the distribution of the cell sizes increases, the quantity of cells having a significantly greater diameter than average cell diameter increases. In general, the larger the cell diameter the greater the probability that cell wall rupture will occur.

Examples of a suitable catalyst emulsifiers include glycerine, dimethyl siloxane, sorbitan monopalmitate, polysorbate 40, propylene glycol, ethylene glycol, and higher molecular weight oils, such as castor oil or mineral oil. Preferably, the catalyst emulsifier is glycerine. The catalysts emulsifier can be present in an amount suitable for enhancing the ability of the catalyst to homogenize in the foamable composition and form the desired cell size. Suitable amounts of the catalyst emulsifier have been found to be from about 1 to about 20 wt. %, preferably about 1 to about 10 wt. %, based on the total weight of the foamable composition.

A preferred foamable composition is formulated from a composition comprising:
about 20 to about 90 wt. % of resol resin;
about 1 to about 30 wt. % of bond strength enhancing agent;
about 1 to about 30 wt. % of blowing agent; and
about 1 to about 30 wt. % of catalyst, based on the total weight of the foamable composition.

More preferably, the foamable composition is formulated from a composition comprising:
about 30 to about 90 wt. % of resol resin;
about 1 to about 20 wt. % of bond strength enhancing agent;
about 1 to about 20 wt. % of blowing agent;
about 1 to about 20 wt. % of catalyst; and
optionally about 1 to about 20 wt. % of additives, based on the total weight of the foamable composition.

The foamable composition can contain additives such as gamma butyrolactone, carbon and glass fibers, dyes, and pigments. However, the phenolic resin is preferably substantially free-of particulate matter that can cause pin holes in the foam cell walls. Examples of particulate matter includes salts that may form during manufacture of the resol resin and/or particulate fillers added to the resol resin forming components or the foamable composition. In a preferred example, oxalic acid is used to adjust the pH of the reaction for making the resol resin and the oxalic salt produced is separated from the resol resin before the resol resin is used to form a foamable composition.

The foamable composition can also contain a surfactant for emulsifying the components present in the foamable composition. The surfactant preferably has the ability to lower the surface tension and stabilize the cells during blowing. Examples of suitable surfactants include the well-known silicone surfactants, such as dimethyl siloxanes. Commercial examples of silicone surfactants include SF-1288 (General Electric), L-5340, L-5310, and L-7003 (Union Carbide Corp.), and DC 193 (Dow Corning). The surfactant can be present in an amount suitable for stabilizing the cells during blowing. Examples of suitable amounts of surfactant include from about 1 to about 20 wt. %, preferably from about 1 to about 10 wt. %.

While the viscosity of the foamable composition is not critical, usually the viscosity of the foamable composition is from about 6,000 to about 20,000 cps (25° C.).

Usually, some water is desirable in the foamable composition to adjust the viscosity to that which is desirable for the forming a foam. When water is present in the foamable composition, the solids content of the foamable composition is preferably greater than about 70%, more preferably greater than about 80%.

(2) Novel Nucleating Agent

Surprisingly, it has now been found that by utilizing a combination of a blowing agent and a phenolic resin nucleating agent in an amount which provides a cell size of about 0.5 mm or less, preferably about 0.2 mm to about 0.5 mm, a closed-cell phenolic resin foam can be formed under substantially atmospheric pressure, which has a friability of less than 50%, preferably less than about 40%, and most preferably about 30% or less. Surprisingly, a closed-cell phenolic resin foam can be produced under substantially atmospheric pressure having upwards of 80% of the cells being closed, and even about 90% or more of the cells being closed, as measured using ASTM D 2856-94.

The phenolic resin nucleating agent should have an average particle diameter less than 0.1 mm, preferably about 0.09 mm or less. Examples of suitable phenolic resin nucleating agents include silicon dioxide, talc, methylcellulose, and microspheres, such as alumina, silicate, or thermoplastic microsperes. Preferably, the nucleating agent is talc.

The phenolic resin nucleating agent can be added in an amount which provides a closed-cell phenolic resin foam.

Suitable amounts are from about 1 to about 30% by weight, preferably about 1 to about 20% by weight, and more preferably about 1 to about 10% by weight, based on the total weight of the foamable, phenolic resin composition.

Preferably, the phenolic resin nucleating agent and blowing agent are selected such that cells having a diameter of about 0.5 mm or less, more preferably about 0.2 mm to about 0.5 mm, are produced during blowing and curing of the foam.

A preferred foamable composition is formulated from a composition comprising:
  about 20 to about 90 wt. % of resol resin;
  about 1 to about 30 wt. % of phenolic resin nucleating agent;
  about 1 to about 30 wt. % of blowing agent; and
  about 1 to about 30 wt. % of catalyst, based on the total weight of the foamable composition.

More preferably, the foamable composition is formulated from a composition comprising:
  about 30 to about 90 wt. % of resol resin;
  about 1 to about 20 wt. % of phenolic resin nucleating agent;
  about 1 to about 20 wt. % of blowing agent;
  about 1 to about 20 wt. % of catalyst; and
  optionally about 1 to about 20 wt. % of additives, based on the total weight of the foamable composition.

Novel Blended Blowing Agent

A blended blowing agent comprising a mixture of materials having different boiling points or gas forming temperatures can be used advantageously in combination with the bond strength enhancing agent and/or the phenolic resin nucleating agent. In the blended blowing agent, a mixture of volatile liquids having different boiling points are used such that as the temperature is increased during blowing and curing one blowing agent boils first, followed by a second, and so on to provide a smoother increase in pressure on the cell walls as the temperature is increased, which provides a smoother formation and expansion of the cell diameter. In contrast, when only one blowing agent is used, a rapid increase in the cell wall pressure can occur when the boiling point of the blowing agent is reached followed by a significantly slower increase in pressure as the now gaseous blowing agent expands as the temperature is increased. Substantial variations in the cell wall pressure during blowing and curing caused by a singular blowing agent can result in undesirable rupture of cells walls.

A smooth increase in cell wall pressure during blowing and curing is also desired because it can contribute to providing a narrow distribution of cell sizes in the foam. A narrow distribution of cell sizes is desired, because the narrower the distribution of cell sizes usually the more uniform the phenolic resin foam and the greater the closed-cell content. As the distribution of the cell sizes increases, the quantity of cells having a significantly greater diameter than average cell diameter increases.

Based on the disclosure provided herein, one skilled in the art will be able to formulate the blended blowing agent from conventional blowing agents. Liquid and/or solid blowing agents can be used. Preferably, the blended blowing agent is formulated from a mixture of volatile liquids such that at least two of the volatile liquids have different boiling points within the temperature range of about 30 to about 70° C. Preferably, the difference in boiling point between two of the volatile liquids is at least 5° C., preferably at least about 10° C., more preferably at least about 20° C. Most preferably, the blended blowing agent comprises at least three volatile compounds each having a different boiling point within the temperature range of about 30 to about 70° C. Preferably, the difference in boiling point between each of three volatile liquids is at least 5° C., preferably at least about 10° C., more preferably at least about 20° C. An example of a particularly preferred blowing agent is JFI 50/50, which comprises about 20 vol. % hexane, about 30 vol. % petroleum ether, and about 50 vol. % pentane.

The blended blowing agent can be used in an amount sufficient to provide the desired cell size. Examples of suitable amounts of liquid volatile blowing agent have been found to be from about 1 to about 30 wt. %, preferably from about 1 to about 20 wt %, and most preferably from about 1 to about 15 wt %, based on the total weight of the foamable composition.

Any combination of (1) bond strength enhancing agent, (2) phenolic resin nucleating agent, and blended blowing agent can be utilized to tailor the properties of the closed-cell phenolic resin foam as desired. Based on the disclosure provided herein, one skilled in the art will now be able to provide a broad range of phenolic resin foams, from rigid through flexible, as well as small through large cell size.

The novel closed-cell phenolic resin foams made according to the present invention can be used, for example, wherever conventional closed- cell foams are useful. The novel closed-cell phenolic resin foams can also be used for applications which require the use of non-flammable materials or the use of materials which do not provide substantial amounts of hazardous materials when exposed to heat. Specific examples of suitable uses include pipe insulation, freezer panel insulation, core material for aircraft, core material for high speed trains, insulation for HVAC equipment, commercial insulation for buildings, marine insulation, RV and mobile home insulation, roof insulation, tank insulation (such as chemical, wax, fuel, and the like), filler for honeycomb applications, acoustical applications, and insulation where acids and alkali are present.

The present invention will be further explained by the following non- limiting examples and comparative examples.

EXAMPLES 1 THROUGH 9

The use of the bond strength enhancing agent in combination with the blended blowing agent according to the present invention was tested. A first resol resin (resin A) was formed as follows. 2700 grams of formaldehyde was combined with 1,441 grams of phenol in a 5 liter reaction flask to form a reaction mixture. The reaction mixture was heated to about 55° C. and then 28.8 grams of potassium hydroxide was added to the reaction mixture. The temperature rose and refluxing began. The temperature was held at 80° C. for about 2 hours, after which the water tolerance was determined to be 6.82. A water tolerance of about 6.5 represents that the resin being formed has an average molecular weight of about 150. The reaction was continued until a water tolerance of about 1.75 is achieved, which represents that the resin being formed has a number average molecular weight of about 350. After another hour, the water tolerance was determined to be 2.45. The refluxing was stopped and the mixture was neutralized by adding 24 grams of oxalic acid. The pH was measured to be 5.8. A distillation was started. The refractive index was found to be 1.5720 after about 2.5 hours of distillation at 60° C. The refractive index can be used to provide an estimate of the solids content. The reaction was shut down, the batch was drawn off and refrigerated overnight. The physical properties of the resin were measured and reported in Table 1.

TABLE 1

| Test Results | |
| --- | --- |
| pH | 5.8 |
| Solids Content (vol. %) | 81.5 |
| Viscosity (cps) (25° C.) | 8300 |
| Reactivity | 180° F. in 6.8 minutes |
| Free Formaldehyde (vol. %) | <1 |
| Free Phenol (vol. %) | 5.2 |
| Karl Fisher Test (vol. %) | 6.5 |

A second resol resin (resin B) was formed as follows. 2,700 grams of formaldehyde was combined with 1,250 grams of phenol and 75 grams of polyvinyl alcohol ("PVA") in a reaction flask to form a reaction mixture. The reaction mixture was heated to about 58° C. and then 31.3 grams of potassium hydroxide was added to the reaction mixture. The temperature rose to about 90°, refluxing began, and the PVA melted into solution. The temperature was held at about 84° C. for about 2 hours, and the water tolerance was determined to be 2.801. The refluxing was stopped and the mixture was neutralized by adding 23.2 grams of oxalic acid. A distillation was started to distill off the water formed until the refractive index was 1.5730, which took about 1 hour and 40 minutes. The reaction was shut down, the batch was drawn off and refrigerated overnight. The physical properties of the resin were measured and reported in Table 2.

TABLE 2

| Test Results | |
| --- | --- |
| pH | 6 |
| Solids Content (vol. %) | 81.5 |
| Viscosity (cps) (25° C.) | 12000 |
| Reactivity | 175° F. in 6.8 minutes |
| Free Formaldehyde (vol. %) | <1 |
| Free Phenol (vol. %) | 5.2 |
| Karl Fisher Test (vol. %) | 5.8 |

A third resol resin (resin C) was formed as follows. 2,700 grams of formaldehyde was combined with 1,441 grams of phenol in a reaction flask to form a reaction mixture. The reaction mixture was heated to about 50° C. and then 28.82 grams of potassium hydroxide was added to the reaction mixture. The temperature rose to 60° during which refluxing began. The temperature was held at about 85° C. for about 2.5 hours, and the water tolerance was determined to be 2.41. The refluxing was stopped and the mixture was neutralized by to a pH of about 6 by adding 26 grams of oxalic acid. A distillation was started to distill off the water formed until the refractive index was 1.5670, which took about 2 hours. 52 grams of PVA was then added to the mixture. The reaction was shut down, the batch was drawn off and refrigerated overnight. The physical properties of the resin were measured and reported in Table 3.

TABLE 3

| Test Results | |
| --- | --- |
| pH | 6.2 |
| Solids Content (vol. %) | 81.5 |
| Viscosity (cps) (25° C.) | 8600 |
| Reactivity | 175° F. in 7.5 minutes |
| Free Formaldehyde (vol. %) | <1 |
| Free Phenol (vol. %) | 4.8 |
| Karl Fisher Test (vol. %) | 6.4 |

Foamable, phenolic resin compositions were formulated by combining in the components shown in Table 4 as follows. The resin was first combined with dimethyl silioxane, 1,3-dichloro-2-propanol phosphate, and carbon black (if present) and mixed for about one minute. Then the JFI 50/50 was added to the mixture and stirred for about one minute. Ultra TX and glycerine were added and the mixture was stirred until the temperature reached about 85° F. The mixture was then dumped into a mold. The temperature reached about 140° F. for about 30 minutes. The properties of the formed foams were tested, and the results are shown in Table 4.

TABLE 4

| Component (grams) | Example 1 | Example 2 | Example 3 | Example 4 | Example 5 | Example 6 | Example 7 | Example 8 | Example 9 |
| --- | --- | --- | --- | --- | --- | --- | --- | --- | --- |
| Resol Resin A | 200 | 200 | 0 | 0 | 0 | 0 | 0 | 0 | 0 |
| Resol Resin B | 0 | 0 | 400 | 0 | 0 | 0 | 0 | 0 | 0 |
| Resol Resin C | 0 | 0 | 0 | 200 | 200 | 200 | 100 | 100 | 100 |
| Catalyst SLR-1 | 0 | 0 | 0 | 34 | 30 | 38 | 39 | 26 | 30 |
| Dimethyl Siloxane | 4 | 4 | 8 | 4 | 4 | 4 | 4 | 4 | 4 |
| 1,3-dichloro-2-propanol phosphate | 4 | 4 | 8 | 8 | 4 | 4 | 2 | 4 | 2 |
| JFI 50/50 | 24 | 18 | 40 | 15.6 | 19.9 | 22 | 24 | 20 | 20 |
| Carbon Black | 1.5 | 1.5 | 2.5 | 0 | 0 | 0 | 0 | 0 | 0 |
| Ultra TX | 21 | 20 | 40 | 0 | 0 | 0 | 0 | 0 | 0 |
| Poly Vinyl Alcohol | 0 | 0 | 0 | 4.7 | 4.5 | 2.2 | 2 | 2.1 | 1.7 |
| Glycerine | 16 | 16 | 20 | 0 | 0 | 0 | 0 | 0 | 0 |
| Test Results | | | | | | | | | |
| pH | 4.5 | 4.75 | 4.5 | | | | | | |
| Compression in X Direction (psi) | 20.4 | 25.4 | 23.2 | | | | | | |
| Compression in Y Direction (psi) | 17.3 | 19.8 | 18.3 | | | | | | |
| Closed-cell Content (%) | 78.6 | 86 | 86 | 46 | 90 | 86 | 89 | 92 | 13 |
| Pounds Per Cubic Foot | 1.7 | 2.2 | 2.1 | | | | | | |

TABLE 4-continued

| | Example 1 | Example 2 | Example 3 | Example 4 | Example 5 | Example 6 | Example 7 | Example 8 | Example 9 |
|---|---|---|---|---|---|---|---|---|---|
| Cell Size (mm) | <.1 | <.1 | <.1 | | | | | | |

Catalyst SLR-1 is 30% XSA, 70% TSA, cut with 30% ethylene glycol, then add 50% glycerine.

The results shown Table 4 demonstrate that surprisingly the foamable phenolic resin compositions according to present invention containing a bond strength enhancing agent are capable of providing a closed-cell content of at least about 80%, and even at least about 90%, when blown and cured under substantially atmospheric pressure. This is a significant and unexpected advantage over conventional foamable phenolic resin compositions which require the use of high pressure to form a foam having such a high closed-cell content.

It is noted that the closed-cell content in Examples 4 and 9 were low compared to the other Examples according to the present invention. However, the closed-cell content achieved in Examples 4 and 9 are still considerably greater than what would be expected when blowing and curing a foamable phenolic resin composition under substantially atmospheric pressure. Typically, foamable phenolic resin compositions produce substantially open cell foams when blown and cured under atmospheric pressure, as shown in the following comparative examples.

COMPARATIVE EXAMPLES A–K

A resol resin (resin D) was formed as follows. 2000 grams of formaldehyde was combined with 1,094 grams of phenol in a reaction flask to form a reaction mixture. The reaction mixture was heated to about 60° C. and then 20 grams of triethylamine ("TEA") and 29.5 grams of potassium hydroxide was added to the reaction mixture. The temperature rose to about 90° C. and refluxing began. The temperature was held at about 80° C. for about 3 hours, after which the water tolerance was determined to be 2.8. The refluxing was stopped and the mixture was neutralized by adding 64 grams of oxalic acid. The pH was measured to be 6.4. A distillation was started and run until the refractive index was found to be 1.5670. The reaction was shut down, the batch was drawn off and refrigerated overnight. The physical properties of the resin were measured and reported in Table 5.

TABLE 5

| Test Results | |
|---|---|
| pH | 6.4 |
| Solids Content (vol. %) | 83 |
| Viscosity (cps) (25° C.) | 17,500 |
| Reactivity | 230° F. in 6.5 minutes |
| Free Formaldehyde (vol. %) | 2.6 |
| Free Phenol (vol. %) | 5.3 |
| Karl Fisher Test (vol. %) | 6.8 |

A resol resin (resin E) was formed as follows. 2,000 grams of formaldehyde was combined with 1,173 grams of phenol in a reaction flask to form a reaction mixture. The reaction mixture was heated to about 55° C. and then 23.4 grams of potassium hydroxide was added to the reaction mixture. The temperature rose to about 90° and refluxing began. The temperature was held at about 85° C. for about 3 hours, and the water tolerance was determined to be 3.1. The refluxing was stopped and the mixture was neutralized by adding 54 grams of oxalic acid. A distillation was started to distill off the water formed until the refractive index was 1.5756. The reaction was shut down, the batch was drawn off and refrigerated overnight. The physical properties of the resin were measured and reported in Table 6.

TABLE 6

| Test Results | |
|---|---|
| pH | 6 |
| Solids Content (vol. %) | 78.4 |
| Viscosity (cps) (25° C.) | 6000 |
| Reactivity | 210° F. in 7 min. |
| Free Formaldehyde (vol. %) | 1.8 |
| Free Phenol (vol. %) | 6.4 |
| Karl Fisher Test (vol. %) | 7.2 |

A resol resin (resin F) was formed as follows. 2,000 grams of formaldehyde was combined with 1,173 grams of phenol in a reaction flask to form a reaction mixture. The reaction mixture was heated to about 55° C. and then 28.3 grams of potassium hydroxide was added to the reaction mixture. The temperature rose to 65° during which refluxing began. The temperature was held at about 80° C. until the water tolerance was determined to be 1.78. The refluxing was stopped and the mixture was neutralized by to a pH of about 6.5 by adding oxalic acid. A distillation was started to distill off the water formed until the refractive index was 1.5590. 28.2 grams of urea was then added to the mixture. The reaction was shut down, the batch was drawn off and refrigerated overnight. The physical properties of the resin were measured and reported in Table 7.

TABLE 7

| Test Results | |
|---|---|
| pH | 6.5 |
| Solids Content (vol. %) | 80.4 |
| Viscosity (cps) (25° C.) | 14,000 |
| Reactivity | 192° F. in 9 min. |
| Free Formaldehyde (vol. %) | 1 |
| Free Phenol (vol. %) | 4.2 |
| Karl Fisher Test (vol. %) | 7.8 |

Foamable phenolic resin compositions were formulated by combining in the components shown in Table 8 as follows. The resins were first combined with dimethyl siloxane and carbon black (if present) and mixed for about one minute. Then the blowing was added to the mixture and stirred for about one minute. The catalyst were added and the mixture was stirred until the temperature reached about 85° F. The mixture was then dumped into a mold. The properties of the formed foams were tested, and the results are shown in Table 8.

TABLE 8

| | Comp. Example A | Comp. Example B | Comp. Example C | Comp. Example D | Comp. Example E | Comp. Example F | Comp. Example G | Comp. Example H | Comp. Example I | Comp. Example J | Comp. Example K |
|---|---|---|---|---|---|---|---|---|---|---|---|
| Component (grams) | | | | | | | | | | | |
| Resol Resin D | 100 | 200 | 200 | 200 | 100 | 0 | 0 | 0 | 0 | 0 | 0 |
| Resol Resin E | 0 | 0 | 0 | 0 | 0 | 200 | 200 | 200 | 200 | 200 | 0 |
| Resol Resin F | 0 | 0 | 0 | 0 | 0 | 0 | 0 | 0 | 0 | 0 | 200 |
| DC 193 | 5 | 15 | 8 | 4 | 5 | 8 | 0 | 0 | 8 | 4 | 4 |
| Dimethyl Siloxane | 0 | 0 | 0 | 0 | 0 | 0 | 8 | 10 | 0 | 4 | 0 |
| Polysorbate 40 | 0 | 0 | 0 | 0 | 0 | 0 | 0 | 5 | 0 | 0 | 4 |
| Ethylene Glycol | 0 | 0 | 0 | 0 | 0 | 2 | 4 | 0 | 5 | 0 | 0 |
| JFI 50/50 | 20 | 24 | 24 | 24 | 12 | 20 | 15 | 0 | 0 | 0 | 24 |
| Pentane | 0 | 0 | 0 | 0 | 0 | 0 | 0 | 20 | 20 | 0 | 0 |
| Pentane/Ether | 0 | 0 | 0 | 0 | 0 | 0 | 0 | 0 | 0 | 20 | 0 |
| Carbon Black | 1.5 | 2 | 2 | 2 | 1.5 | 1.5 | 1.5 | 1.5 | 1.5 | 1.5 | 0 |
| PSA | 0 | 0 | 0 | 0 | 0 | 20 | 0 | 0 | 0 | 0 | 0 |
| XSA/TSA | 0 | 0 | 0 | 0 | 0 | 0 | 20 | 0 | 0 | 0 | 0 |
| Catalyst SR-1 | 10 | 20 | 21 | 24 | 12 | 0 | 0 | 22 | 20 | 20 | 20 |
| Test Results | | | | | | | | | | | |
| pH | | | | | | | | | | | |
| Compression in X Direction (psi) | | | | | | 14 | 25 | 30 | 27 | 20 | |
| Compression in Y Direction (psi) | | | | | | | | | | | |
| Closed-cell Content (%) | 3 | 2 | 1 | 3 | .4 | 1.4 | 2 | .4 | 1.2 | .8 | 1.4 |
| Pounds per Cubic Foot | 1.7 | 2 | 2.1 | 2.5 | 1.7 | 1.75 | 2.1 | 2.5 | 2.2 | 1.75 | 2.1 |
| Cell Size (mm) | | | | | | | | | | | |

Catalyst SLR-1 is 30% XSA, 70% TSA, cut with 30% ethylene glycol, then add 50% glycerine.
Tween 40 (ICI Corp.) is polysorbate.

The test results in Table 8 demonstrate that closed-cell phenolic resin foams are very difficult to produce under atmospheric pressure. These results are typical for foams made from phenolic resin compositions that have been commonly used.

EXAMPLE 10

A pilot plant scale example using a combination of the phenolic resin nucleating agent and the blended blowing agent was tested. A phenolic resin was first formed by combining the following components:

| | |
|---|---|
| formaldehyde | 35,141 lbs. |
| phenol | 14,855 lbs. |
| potassium hydroxide | 1,625 lbs. |
| oxalic acid | 2,250 lbs. |

The components were reacted until a water tolerance end point of about 2 was achieved. The water tolerance end point was 2.41 when the reaction was stopped. On a large scale production, such as this example, the reaction should be cut off at a higher water tolerance than in small scale productions, since the large bulk of the components will continue to react after cut off and the final water tolerance end point will be significantly lower when the reactions finally cease. In this example, the final water tolerance end point is believed to be about 1.25, which represents a phenolic resin having a molecular weight of about 400. A foamable phenolic resin composition was formed by combining the components shown in Table 9. A batch mixer was used to mix the components. After mixing, the mixture was placed into a 4 foot by 8 foot mold and allowed to fully cure. The properties of the cured phenolic resin were measured by an independent laboratory and they are shown in Table 10.

TABLE 9

| Component | Amount (pounds) |
|---|---|
| Resol Resin | 600 |
| Dimethyl Siloxane | 12 |
| Polysorbate 40 | 6 |
| Talc | 35 |
| Ultra TX | 50 |
| Glycerin | 30 |
| JFI 50/50 | 55 |
| Carbon Black | 3.5 |

TABLE 10

| Property | |
|---|---|
| Compressive Strength, Parallel (psi) | 29 |
| Compressive Strength, Across (psi) | 15 |
| Compressive Strength, Down (psi) | 18 |
| Compressive Modulus, Parallel (psi) | 1,268 |
| Compressive Modulus, Across (psi) | 387 |
| Compressive Modulus, Down (psi) | 467 |
| Density (pcf) | 2.0 |
| Shear Strength, Parallel (psi) | 16 |
| Shear Strength, Across (psi) | 12 |
| Shear Strength, Down (psi) | 16 |
| Shear Modulus, Parallel (psi) | 287 |
| Shear Modulus, Across (psi) | 245 |
| Shear Modulus, Down (psi) | 279 |
| Flexural Strength, Parallel (psi) | 15 |
| Flexural Strength, Down (psi) | 14 |
| Flexural Modulus, Parallel (psi) | 620 |
| Flexural Modulus, Down (psi) | 587 |
| Friability (%) | 33 |

TABLE 10-continued

| Property | |
|---|---|
| Open Cell (%) | 9 |
| Closed Cell (%) | 91 |
| Dimensional Stability, Heat (% change @ 14 days) | −13 |
| Dimensional Stability, Humid (% change @ 14 days) | −7 |
| Dimensional Stability, Freeze (% change @ 14 days) | −35 |

The test results in Table 10 demonstrate the phenolic resin nucleating agent and blended blowing agent according to the present invention can be utilized to provide a closed-cell phenolic resin foam having a closed cell content of at least about 90%, even when formed under substantially atmospheric pressure. This is a significant and unexpected advantage over conventional foamable phenolic resin compositions which require the use of high pressure to form a foam having such a high closed-cell content.

Test Methods

Average Cell Size

The average cell size was measured directly using a micrometer and microscope.

Closed-Cell Concentration

The closed-cell concentration was measured using ASTM D 2856-94.

Compression

The compression values of the phenolic resin foams was measured according to ASTM D 1621-94.

Reactivity

Incubate resol resin for 24 hours at 25° C. Weigh 50 grams of resol resin into a beaker. Turn stirrer on to 3000 rpm and then add 10 grams of 50% sulphuric acid diluted with water. Mix for 20 seconds. Then place sample in foam insulation block and insert pyrometer probe. The maximum temperature reached and the time to reach the maximum temperature are measured and reported.

Solids Concentration

Weigh 10 grams of resol resin (green weight) in an aluminum tray. Preheat oven to 149° C. with draft open. Place resin in oven for one hour. Remove resin from oven and weigh (dry weight). The following formula is used for determining the solids content:

$$\frac{\text{Resin Dry Weight}}{\text{Resin Green Weight}} \times 100\% = \% \text{ solids}$$

I claim:

1. A foamable, phenolic resin composition adapted to form a closed-cell phenolic resin foam under substantially atmospheric pressure, said foamable, phenolic resin composition being formulated from a composition comprising:

a resol resin;

a blowing agent comprising at least two compounds have a boiling points which are separated by at least 10° F. and each different boiling point is within the temperature range of from about 30 to about 70° C.; and a bond strength enhancing agent which enhances the strength of a bond formed between phenol groups of said resol resin during formation of said closed-cell phenolic resin foam, wherein said bond strength enhancing agent is selected and present in an amount sufficient to provide a strength of said bond which is greater than a pressure provided by said blowing agent during blowing and curing of said closed-cell phenolic resin foam, and wherein said bond strength enhancing agent comprises a carbon containing compound having hydroxyl groups that are capable of reacting with methylol groups present on said resol.

2. A foamable, phenolic resin composition according to claim 1, wherein said resol resin is formed from formaldehyde and phenol.

3. A foamable, phenolic resin composition according to claim 1, wherein said bond strength enhancing agent comprises at least one of polyvinyl alcohol polyvinyl acetate, resorcinol, urea, melamine, polyvinyl alcohol, or 1,3-dichloro-2-propanol phosphate.

4. A foamable, phenolic resin composition according to claim 1, wherein said bond strength enhancing agent comprises 1,3-dichloro-2-propanol phosphate.

5. A foamable, phenolic resin composition according to claim 1, wherein said resol resin is present in an amount of from about 20 to about 90 weight %, said bond strength enhancing agent is present in an amount of from about 1 to about 30 weight %, and said blowing agent is present in an amount of from about 1 to about 30 weight %, based on the total weight of said foamable, phenolic resin composition.

6. A foamable, phenolic resin composition according to claim 1, wherein said resol resin is present in an amount of from about 30 to about 90 weight %, said bond strength enhancing agent is present in an amount of from about 1 to about 20 weight %, and said blowing agent is present in an amount of from about 1 to about 20 weight %, based on the total weight of said foamable, phenolic resin composition.

7. A foamable, phenolic resin composition according to claim 1, further comprising from about 1 to about 30 weight % of catalyst, based on the total weight of said foamable, phenolic resin composition.

8. A foamable, phenolic resin composition according to claim 1, wherein said blowing agent comprises at least three compounds, each having a different boiling point.

9. A foamable, phenolic resin composition according to claim 8, wherein said three compounds each have boiling points which are separated by at least 10° F. and each different boiling point is within the temperature range of from about 30 to about 70° C.

10. A foamable, phenolic resin composition according to claim 1, wherein said blowing agent comprises a mixture of ether, hexane, and pentane.

11. A closed-cell phenolic resin foam which has been formed under substantially atmospheric pressure, said closed-cell phenolic resin foam being formulated from a foamable, phenolic resin composition comprising:

a resol resin;

a blowing agent comprising at least two compounds have a boiling points which are separated by at least 10° F. and each different boiling point is within the temperature range of from about 30 to about 70° C.; and a bond strength enhancing agent which enhances the strength of a bond formed between phenol groups of said resol resin during formation of said closed-cell phenolic resin foam, wherein said bond strength enhancing agent is selected and present in an amount sufficient to provide a strength of said bond which is greater than a pressure provided by said blowing agent during blowing and curing of said closed-cell phenolic resin foam, wherein said bond strength enhancing agent comprises a carbon containing compound having hydroxyl groups that are capable of reacting with methylol groups present on said resol, and wherein at least a portion of said blowing agent is contained withing closed cells of said closed-cell foam.

12. A closed-cell phenolic resin foam according to claim 11, wherein said bond strength enhancing agent comprises at least one of polyvinyl alcohol polyvinyl acetate, resorcinol, urea, melamine, polyvinyl alcohol, or 1,3-dichloro-2-propanol phosphate.

13. A closed-cell phenolic resin foam according to claim 11, wherein said bond strength enhancing agent comprises 1,3-dichloro-2-propanol phosphate.

14. A closed-cell phenolic resin foam according to claim 11, wherein said blowing agent comprises at least three compounds, each having a different boiling point.

15. A closed-cell phenolic resin foam according to claim 14, wherein said three compounds each have boiling points which are separated by at least 10° F. and each different boiling point is within the temperature range of from about 30 to about 70° C.

16. A closed-cell phenolic resin foam according to claim 11, wherein said blowing agent comprises a mixture of ether, hexane, and pentane.

17. A closed-cell phenolic resin foam according to claim 11, wherein said foam has a closed cell content of at least about 80%.

18. A closed-cell phenolic resin foam according to claim 11, wherein said foam has a closed cell content of at least about 90%.

19. A method of forming a closed-cell phenolic resin foam comprising:
   blowing and curing a foamable, phenolic resin composition under substantially atmospheric pressure, wherein said foamable, phenolic resin is formulated from a composition containing:
   a resol resin;
   a blowing agent comprising at least two compounds have a boiling points which are separated by at least 10° F. and each different boiling point is within the temperature range of from about 30 to about 70° C.; and
   a bond strength enhancing agent which enhances the strength of a bond formed between phenol groups of said resol resin during formation of said closed-cell phenolic resin foam, wherein said bond strength enhancing agent is selected and present in an amount sufficient to provide a strength of said bond which is greater than a pressure provided by said blowing agent during blowing and curing of said closed-cell phenolic resin foam, and wherein said bond strength enhancing agent comprises a carbon containing compound having hydroxyl groups that are capable of reacting with methylol groups present on said resol.

20. A method of forming a closed-cell phenolic resin foam according to claim 19, wherein said resol resin is formed from formaldehyde and phenol.

21. A method of forming a closed-cell phenolic resin foam according to claim 19, wherein said bond strength enhancing agent comprises at least one of polyvinyl alcohol polyvinyl acetate, resorcinol, urea, melamine, polyvinyl alcohol, or 1,3-dichloro-2-propanol phosphate.

22. A method of forming a closed-cell phenolic resin foam according to claim 19, wherein said bond strength enhancing agent comprises 1,3-dichloro-2-propanol phosphate.

23. A method of forming a closed-cell phenolic resin foam according to claim 19, further comprising from about 1 to about 30 weight % of catalyst, based on the total weight of said method of forming a closed-cell phenolic resin foam.

24. A method of forming a closed-cell phenolic resin foam according to claim 19, wherein said blowing agent comprises at least three compounds, each having a different boiling point.

25. A method of forming a closed-cell phenolic resin foam according to claim 24, wherein said three compounds each have boiling points which are separated by at least 10° F. and each different boiling point is within the temperature range of from about 30 to about 70° C.

26. A method of forming a closed-cell phenolic resin foam according to claim 19, wherein said blowing agent comprises a mixture of ether, hexane, and pentane.

27. A foamable, phenolic resin composition adapted to form a closed-cell phenolic resin foam under substantially atmospheric pressure, said foamable, phenolic resin composition being formulated from a composition comprising:
   a resol resin;
   a blowing agent comprising at least two compounds have a boiling points which are separated by at least 10° F. and each different boiling point is within the temperature range of from about 30 to about 70° C.;
   a phenolic resin nucleating agent having an average particle size of less than about 0.1 mm; and
   a bond strength enhancing agent which enhances the strength of a bond formed between phenol groups of said resol resin during formation of said closed-cell phenolic resin foam, wherein said bond strength enhancing agent is selected and present in an amount sufficient to provide a strength of said bond which is greater than a pressure provided by said blowing agent during blowing and curing of said closed-cell phenolic resin foam, and wherein said bond strength enhancing agent comprises a carbon containing compound having hydroxyl groups that are capable of reacting with methylol groups present on said resol.

28. A foamable, phenolic resin composition according to claim 27, wherein said phenolic resin nucleating agent has an average particle size of less than 0.09 mm.

29. A foamable, phenolic resin composition according to claim 27, wherein said phenolic resin nucleating agent comprises talc.

30. A foamable, phenolic resin foam composition according to claim 27, wherein said phenolic resin nucleating agent and said blowing agent are selected and present in an amount to provide cells having an average diameter of about 0.5 mm or less.

31. A foamable, phenolic resin composition according to claim 27, wherein said resol resin is present in an amount of from about 20 to about 90 weight %, said phenolic resin nucleating agent is present in an amount of from about 1 to about 30 weight %, and said blowing agent is present in an amount of from about 1 to about 30 weight %, based on the total weight of said foamable, phenolic resin composition.

32. A foamable, phenolic resin composition according to claim 27, wherein said resol resin is present in an amount of from about 30 to about 90 weight %, said phenolic resin nucleating agent is present in an amount of from about 1 to about 20 weight %, and said blowing agent is present in an amount of from about 1 to about 20 weight %, based on the total weight of said foamable, phenolic resin composition.

33. A foamable, phenolic resin composition according to claim 27, further comprising from about 1 to about 30 weight % of catalyst, based on the total weight of said foamable, phenolic resin composition.

34. A foamable, phenolic resin composition according to claim 27, wherein said blowing agent comprises at least three compounds, each having a different boiling point.

35. A foamable, phenolic resin composition according to claim 34, wherein said three compounds each have boiling points which are separated by at least 10° F. and each different boiling point is within the temperature range of from about 30 to about 70° C.

36. A foamable, phenolic resin composition according to claim 27, wherein said blowing agent comprises a mixture of ether, hexane, and pentane.

37. A closed-cell phenolic resin foam which has been formed under substantially atmospheric pressure, said closed-cell phenolic resin foam being formulated from a foamable, phenolic resin composition comprising:

a resol resin;

a blowing agent comprising at least two compounds have a boiling points which are separated by at least 10° F. and each different boiling point is within the temperature range of from about 30 to about 70° C.;

a phenolic resin nucleating agent having an average particle size of less than about 0.1 mm; and a bond strength enhancing agent which enhances the strength of a bond formed between phenol groups of said resol resin during formation of said closed-cell phenolic resin foam, wherein said bond strength enhancing agent is selected and present in an amount sufficient to provide a strength of said bond which is greater than a pressure provided by said blowing agent during blowing and curing of said closed-cell phenolic resin foam, wherein said bond strength enhancing agent comprises a carbon containing compound having hydroxyl groups that are capable of reacting with methylol groups present on said resol, and wherein at least a portion of said blowing agent is contained withing closed cells of said closed-cell foam.

38. A method of forming a closed-cell phenolic resin foam comprising:

blowing and curing a foamable, phenolic resin composition under substantially atmospheric pressure, wherein said foamable, phenolic resin is formulated from a composition containing:

a resol resin;

a blowing agent comprising at least two compounds have a boiling points which are separated by at least 10° F. and each different boiling point is within the temperature range of from about 30 to about 70° C.:

a phenolic resin nucleating agent having an average particle size of less than about 0.1 mm; and a bond strength enhancing agent which enhances the strength of a bond formed between phenol groups of said resol resin during formation of said closed-cell phenolic resin foam, wherein said bond strength enhancing agent is selected and present in an amount sufficient to provide a strength of said bond which is greater than a pressure provided by said blowing agent during blowing and curing of said closed-cell phenolic resin foam, and wherein said bond strength enhancing agent comprises a carbon containing compound having hydroxyl groups that are capable of reacting with methylol groups present on said resol.

* * * * *